April 13, 1965 D. R. SCOTT ETAL 3,177,898

APPARATUS FOR SEQUENTIAL CONTROL

Filed Oct. 30, 1961 6 Sheets-Sheet 1

INVENTORS
DOUGLAS R. SCOTT
ROLAND D. BECK
BY GEOFFREY A. MANSELL
SAM E. CHENAUR
Robert R. Candor
ATTORNEY INVENTORS
DOUGLAS R. SCOTT
ROLAND D. BECK
BY GEOFFREY A. MANSELL
SAM E. CHENAUR
Robert R. Candor
ATTORNEY INVENTORS
DOUGLAS R. SCOTT
ROLAND D. BECK
BY GEOFFREY A. MANSELL
SAM E. CHENAUR
Robert R Candor
ATTORNEY

APPARATUS FOR SEQUENTIAL CONTROL

Filed Oct. 30, 1961 6 Sheets-Sheet 4

INVENTORS
DOUGLAS R. SCOTT
ROLAND D. BECK
GEOFFREY A. MANSELL
SAM E. CHENAUR
BY Robert R. Dandor
ATTORNEY

APPARATUS FOR SEQUENTIAL CONTROL

HOT WASH CYCLE

| | START | HOT FILL | HOT WASH & AGITATE | SPIN | TEPID FILL | TEPID RINSE & AGITATE | SPIN | SECOND TEPID FILL | SECOND RINSE & AGITATE | SECOND SPIN | PRE-STOP | STOP |
|---|---|---|---|---|---|---|---|---|---|---|---|---|
| MOTORS OPERATING | U,V | U,V | U,V,W | U,V,W | U,V | U,V,W | U,V,W | U,V | U,V,W | U,V,W | U,V | |
| OPENED VALVES | | S | | | S,T | | | S,T | | | | M |
| CLOSED SWITCHES | K | K | K,R | K,R | K | K,R | K,R | K | K,R | K,R | K | |
| VACUUM MOTORS ACTUATED BY INDENTATIONS & READING HEAD | | | | | | | | | | | X | ∘A, ∘B } X |
| | | N | | | N | | | N | | | | ∘C, ∘D } N |
| | | | | | O | | | O | | | | ∘E, ∘F } O |
| | | | | P | | | P | | | P | | ∘G, ∘H } P |
| | | | Q | Q | | Q | Q | | Q | Q | | ∘I, ∘J } Q |

FIG-13

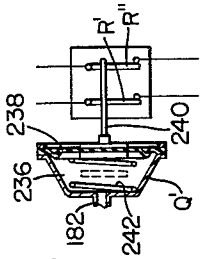

FIG-19A

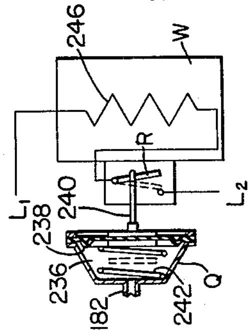

FIG-19

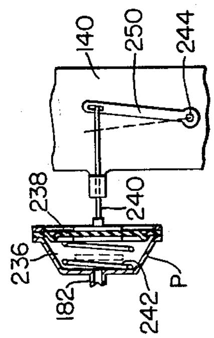

FIG-18

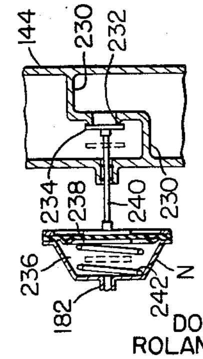

FIG-17

INVENTORS
DOUGLAS R. SCOTT
ROLAND D. BECK
GEOFFREY A. MANSELL
SAM E. CHENAUR
BY Robert R Cander
ATTORNEY

APPARATUS FOR SEQUENTIAL CONTROL

Filed Oct. 30, 1961

INVENTORS
DOUGLAS R. SCOTT
ROLAND D. BECK
GEOFFREY A. MANSELL
SAM E. CHENAUR

BY Robert R. Candor

ATTORNEY 3,177,898
Patented Apr. 13, 1965

3,177,898

APPARATUS FOR SEQUENTIAL CONTROL

Douglas R. Scott, Santa Ana, Roland D. Beck, Anaheim, Geoffrey A. Mansell, San Juan Capistrano, and Sam E. Chenaur, Garden Grove, Calif., assignors to Robertshaw Controls Company, a corporation of Delaware Filed Oct. 30, 1961, Ser. No. 148,322
8 Claims. (Cl. 137—624.11)

This invention is directed to a vacuum type of program control for various mechanisms.

The programmer or timer of this invention includes a flexible member with a sealing surface which is relatively movable with respect to a reading head surface. The flexible member has a fluid conducting indentation bridging an intake port and a discharge port on the reading surface. The margin of the indentation is at the sealing surface of the flexible member and is sealed by the reading head surface in such a manner that the vacuum produced in the indentation produces a localized atmospheric sealing pressure in the area adjacent to the reading head ports. This localized atmospheric sealing pressure reduces the amount of friction which is necessary in passing the flexible member past the reading head, and also insures a better seal against leakage or accidental breaking of the seal. Other parts of the flexible member may loosely contact with various parts of the programmer, or may be completely out of contact with parts of such programmer. Therefore, the flexible member automatically seals itself and adjusts itself to any irregularities in the reading head surface.

Another feature of this invention involves the use of a relatively movable pliable film having indentations which are passed over two or more vacuum ports in a reading head surface. The margins of the indentations form a localized seal between the film and the reading head surface which surrounds the ports. Each indentation forms a self sealed passageway between the ports, and the film automatically adjusts itself to form the seal around the ports. Two or more indentations may pass over the ports simultaneously to form a double indentation which is self sealed around its double margin.

Another feature of this invention includes the use of plurality of indentations on a program member and a plurality of pairs of intake and discharge ports on a reduced head so a plurality of vacuum actuators may be actuated by the vacuum produced by a vacuum pump or other vacuum source which is connected to the intake ports while the plurality of actuators are connected respectively with the plurality of discharge ports. The program member may be a flexible member which is provided with a plurality of indentations to pass over the plurality of pairs of said ports to reduce the friction between the flexible member and the reading head, and to insure a better seal at the margins of the indentations.

Another feature of this invention is the provision of indentations which pass over a pair of vacuum intake and discharge ports, and in which the indentations are spaced from each other in a manner that there is a substantially continuous conduction of fluid from the discharge port toward the intake port of the reading head. In this manner a continuous conduction of the fluid medium is provided in the flexible member, which at the same time seals the area adjacent to the ports, so no substantial amount of atmospheric air can enter the area unless it is purposely admitted by openings for special purposes.

Another feature of this invention includes a flexible film of relatively thin dimensions and in which an indentation or indentations may be formed in such a manner that the one or more indentations are so shaped that they do not collapse under the pressure differential produced on opposite sides of the film by the vacuum produced in the indentations. The film may be in the order of from .003 to .005 inch in thickness more or less and the indentations may be in the form of a closed end channel in the order of .040 inch in width, more or less, and in the order of .040 inch in depth, more or less.

The length of the indentations is sufficient to bridge two or more ports on the reading head surface. The indentations may be arch shaped to aid in resisting collapse under the atmospheric and vacuum differential. The film automatically adjusts itself to any irregularities in the reading head surface. This type of construction permits a relatively thin flexible film to be used without danger of collapse due to the vacuum differential produced on opposite sides of the film. In addition, the film permits a better seal around the margin of the indentation.

Another feature of this invention is the provision of nipples which cooperate with relatively thin tubing to produce an automatic seal at the joints, so the tubing may be quickly placed over the nipples and removed therefrom, in a manner that there is very little danger of leakage between the tube and nipple.

Another feature of this invention is the use of an endless path conveyor for one or more indentations, in which the conveyor is made of a relatively thin film and in which the indentations bridge the vacuum ports of the reading head with a positive sealing action localized adjacent to the ported area of the reading head.

Another feature of this invention is to provide a plurality of closed end channel indentations which are passed over a pair of vacuum ports, with the spacing of the indentations being such that the ports are substantially continuously bridged, as the indentations are serially passed over the reading head.

Another feature of the invention is the provision of a vacuum system in which there is substantially no inward bleed of atmospheric air into the system, except where the air is purposely introduced for special purposes.

Another feature of this invention is to provide a vacuum system in which the vacuum pump may be of very small dimensions, and in which the volume of air to be removed from the system is substantially negligible, so that substantially no volume of air need be transmitted by the pump.

Accordingly, it is an object of this invention to provide a programming system having one or more of the features herein disclosed. Another object of this invention is to provide a method of the programming by vacuum and the like, which method has one or more of the features herein disclosed.

Other objects become apparent from this description and from the accompanying drawings, in which:

FIGURE 13 is a chart showing how the various parts shown in FIGURE 8 are operated during the operations of the washing machine in a typical cycle.

FIGURE 17 is a diagrammatic view of a water valve actuated by a vacuum actuator.

FIGURE 18 is a diagrammatic view of a lever operated device actuated by a vacuum actuator.

FIGURE 19 is a diagrammatic view of an electrical device, such as a motor, which is controlled by a switch operated by a vacuum actuator.

FIGURE 19A is an embodiment somewhat similar to FIGURE 19.

Figure 3A:
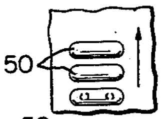
FIGURE 3A is a top view of the flexible program member shown in FIGURE 3.
Figure 3:
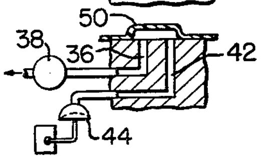
FIGURE 3 is a diagrammatic cross section of a typical reading head connected to a vacuum pump and the like and to a vacuum actuator and the like with a flexible program member being passed over the reading head surface.

Certain words indicating direction, relative position, etc., such as "upper," "lower," "side," "top," "bottom," etc., are used herein for the sake of brevity and clearness. However, it is to be understood that these words are used as applied to the drawings, and that in the actual devices, such direction, relative position, etc. may be entirely different from that shown in the drawings and described in the specification.

Referring first to FIGURES 9, 10, 10A, and 11, for example, a reading head 30 may have a reading head surface 32. It also may have an intake port 34 connected with a fluid passageway 36 for conducting fluid, such as air, toward a relatively lower fluid pressure device or vacuum pump 38. The reading head surface 32 may also have a discharge port 40 with a fluid passageway 42 for conducting relatively higher pressure fluid, such as air, in a direction from a relatively higher pressure device or vacuum actuator 44, which may actuate any desired apparatus or component such as a switch, valve, motor, machine and the like 47. A flexible member such as a plastic card, film, belt, tape, or an endless path carrier of any kind 46 may have a sealing surface 48 relatively movable past and in contact with said reading head surface 32 and may have a fluid conducting indentation, pocket, closed end channel, etc., 50 bridging the ports 34 and 40 and having its margin 52 at said sealing surface 48 and sealed by said reading head surface 32. This said indentation 50 may conduct fluid, such as air, from the discharge port 40 toward the intake port 34.

Figures 9, 9A, 10, 10A, 11, 12:
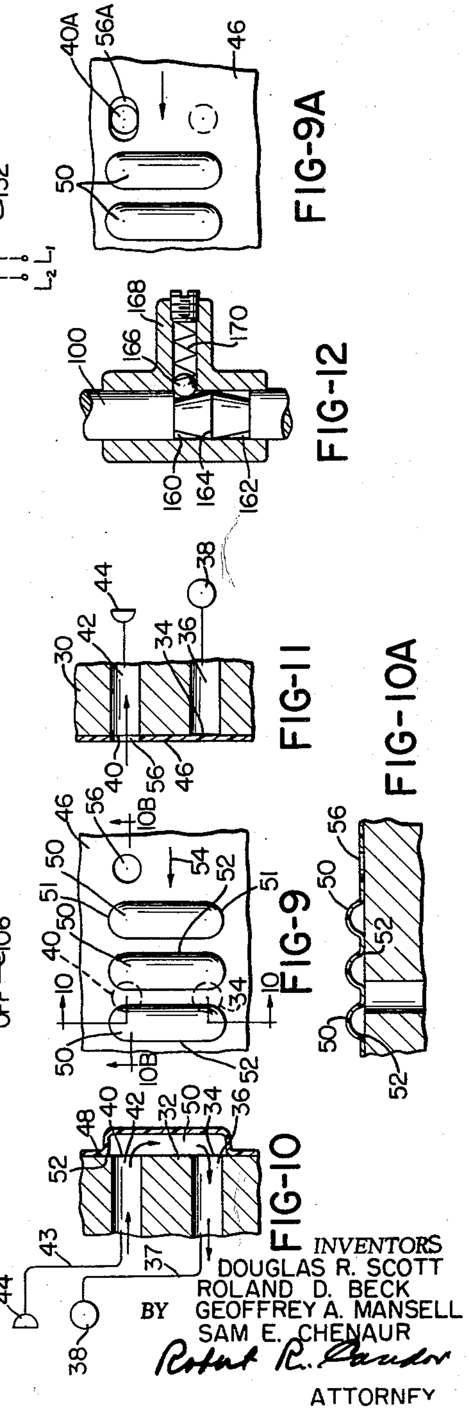
FIGURE 9 is a top view of a flexible program member passing a plurality of indentations over an intake port and discharge port on a reading head.
FIGURE 9A is a view similar to a portion of FIGURE 9, but showing a different shape for the vacuum breaking opening.
FIGURE 10 is a cross section taken along the line 10—10 of FIGURE 9, and also showing a vacuum pump and a vacuum actuator connected to passageways which are connected to said ports.
FIGURE 10A is a vertical cross section along the line 10B—10B of FIGURE 9.
FIGURE 11 is a cross-sectional view taken in the opposite direction along line 10—10, after the flexible member has moved away from the ports and a vacuum breaking opening is moving over one of the ports.
FIGURE 12 is an enlarged view of a detent applied to the setting shaft of FIGURE 8.

The flexible member 46 may have a plurality of conducting indentations 50, as shown in FIGURE 9, serially relatively movable past the ports 34 and 40 to bridge these ports. In the embodiment shown in FIGURES 9, 10, 10A, and 11, the flexible member 46 may be moved leftwardly, as indicated by the arrow 54.

The indentations 50, shown in FIGURE 9, for example, are spaced from each other in a manner that there is a substantially continuous conduction of fluid, such as air, from the discharge port 40 toward the intake port, as long as the plurality of indentations 50 are relatively moving past the ports 34 and 40 to bridge the ports. For example, in FIGURE 9, it is shown that the two most leftward indentations 50 are simultaneously bridging the ports 34 and 40, and that as the flexible member 46 continues to move leftwardly, a time will come when the intermediate indentation 50 will, by itself, bridge the ports 34 and 40. As the flexible member 46 continues to move leftwardly, a time will come when the two rightward indentations 50 will straddle simultaneously the ports 34 and 40 in the same manner that the two leftward ones are actually doing as shown in FIGURE 9. In this manner, a continuous fluid bridging action is taking place between the ports 34 and 40, as long as the indentations 50 continue to pass over these ports.

It is to be noted that the properly spaced indentations 50 produce the effect of a long wide slot in the flexible member 46 inasmuch as a continuous fluid flow action can take place continuously as long as the indentations 50 pass over the ports 34 and 40. However, because of the fact that only two of the indentations are straddling the ports, any edgewise leakage which would take place in a long slot or channel cannot take place because of the fact that the margins 52 of the two indentations form a continuous double margin around the combined double indentation to seal together the surfaces 48 and 32 entirely around the ports 34 and 40.

Another advantage of this construction of the indentations in relation to the ports 34 and 40 is that the flexible member or film 46 is held tightly against the reading head surface 32 only at a zone closely adjacent to the ports 34 and 40, and that elsewhere the film 46 may be loosely engaging the surface 32 without any tightness and without any excessive friction which might otherwise be present. The film also can automatically adjust itself to the contour of the reading head surface.

In FIGURES 9, 10, 10A, and 11, the flexible member or film 46 may be provided with an opening 56 which will pass over and uncover one of the ports, such as port 40, as shown in FIGURE 11, to produce a counterfluid flow in the passageway 42 which is connected with said one port 40. At the same time, the other port 34 may be maintained closed by the flexible member or film 46, as shown in FIGURE 11, where no opening is provided in the flexible member 46 adjacent to the port 34. When the condition shown in FIGURE 11 occurs, the vacuum to the vacuum actuator 44 is broken by the entrance of atmospheric air through the opening 56, whereas the vacuum in the passageway to the vacuum pump 38 is not broken and is maintained operative for use in connection with other pairs of ports which may be placed in the reading head 30, is desired, and which are shown, for example, in FIGURE 8, to which the illustrations of FIGURES 9, 10, 10A, and 11 are applicable.

In FIGURE 9A, the opening 56A is shown as oblong, so that a longer period of time is provided in which atmospheric air may enter through the opening 56A to break the vacuum to the particular or respective vacuum actuator, to which the port 40A may be connected.

Figure 8:
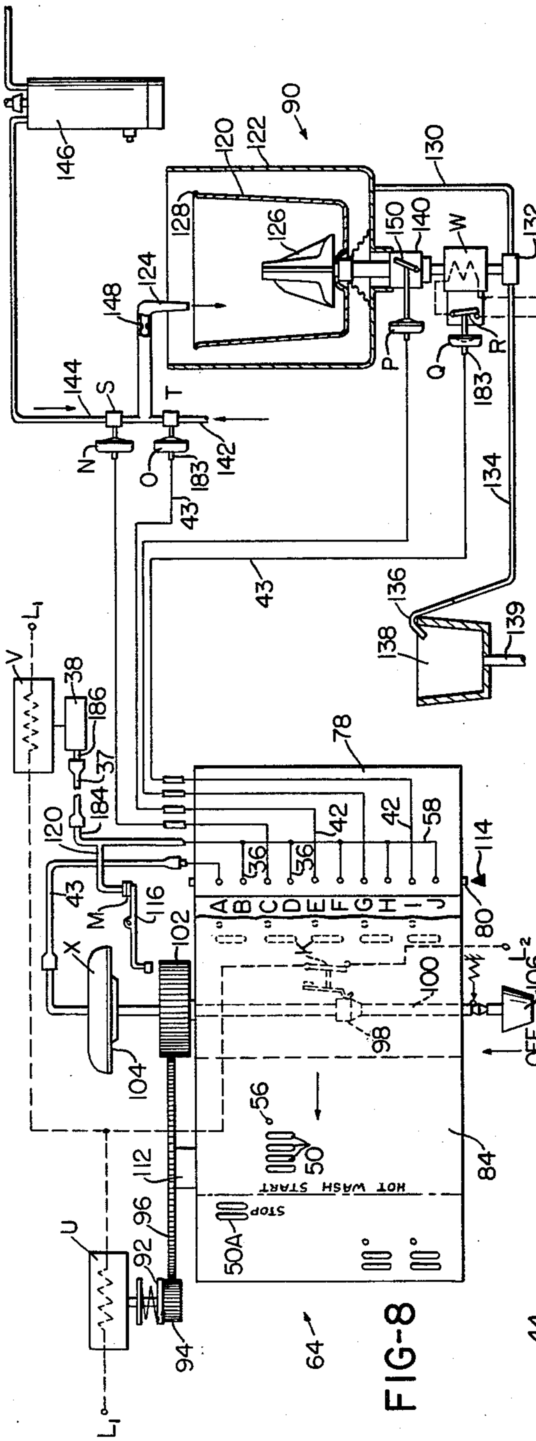
FIGURE 8 shows a controller of the type shown in FIGURES 1 through 7 connected to controlled parts of a washing machine.

If there are a plurality of pairs of ports 34 and 40 on the same reading head, as is the case in FIGURE 8, all of the intake ports corresponding to port 34 may be connected to a suction manifold 58 to which individual passageways may be connected to produce an intake action at the respective ports, as will become more fully apparent.

As will become apparent, the flexible member or film 46 of FIGURES 9, 10 and 11 may take the form of a belt such as is shown in FIGURES 1 through 8 and 14, 15, and 16. This type of belt may be made from a tape, the ends of which are secured together, or the belt may be made as a homogeneous band without any ends joining together. The belt of these embodiments provides an endless path carrier for the indentations 50, as is apparent. If desired, the flexible member 46 may take the form of a card or the like, such as the plastic card 60 or 62 of FIGURES 20 through 26.

The flexible member 46, particularly when used in a belt or the like or other endless type of conveyor, may be in the form of a flexible film, and this film may be in the order of from .003 to .005 inch in thickness. The film may be of a flexibility so it automatically adjusts itself to irregularities in the various parts of the mechanism with which it engages. The indentations 50 may be arch shaped and in the form of closed end channels, the channels being closed at the ends 51 in FIGURE 9. These channels or indentations 50 may be of a size and shape to withstand high atmospheric vacuum pressure differentials. They may be in the order of .040 inch in width more or less, and with an arched roof. The indentations or channels 50 may be in the order of .040 inch in depth, more or less. The length of the indentations is made sufficient to bridge any two or more ports on the reading head. The ports may have a diameter more or less equal to the width of the indentations. The ends of the indentations may also be arched for strength. A typical length used has been $\frac{5}{16}$ inch, more or less. The film, if desired, may be made of any suitable plastic or the like or of any other suitable substance, and may be, for example, made of Mylar, which is now on the market.

In the embodiment shown in FIGURES 9, 10, 10A, and 11, as well as in other embodiments herein disclosed, the vacuum pump 38 may be used in the assembly and the vacuum actuator 44 or a plurality of such vacuum actuators 44 may also be used in the assembly, and may be connected by the passageways 36 and 42 with the ports 40 and 34, the connections being shown in part by a cross section in the reading head 30, and may be produced in part by tubes 43 and 37 which may be intertelescoped with the passages in the reading head by any desired construction, as is shown elsewhere.

As will become apparent, the construction shown in FIGURES 9, 10, 10A, and 11, as applied in FIGURE 8, may operate to control a plurality of controls on a washing machine, or other machine, in a manner to become more fully apparent.

Referring now to FIGURES 1 through 8, the programmer or timer construction 64 may comprise a frame made essentially by the frame plates 66, 68, and 70 joined together by suitable bolt and sleeve constructions 72 and 74. These plates may form supports and/or bearings for the members of the timer construction.

The programmer may include a roller 76 at one end and a ported reading head 78 at the other end. The reading head 78 may be pivoted on pin or pins 80 which permit the reading head to swing in a belt tightening manner under the impulse of the spring 82, which may be a wire spring or the like tending to swing the reading head 78 away from the roller 76. An endless carrier or tape, or belt 84, may be provided with a plurality of indentations 50, similar to indentations 50 of FIGURES 9, 10, 10A, and 11, with proper vacuum breaking openings 56, similar to the vacuum breaking openings 56 of FIGURES 9, 10, 10A, and 11.

The reading head 78 is provided with a plurality of ports A through J, as indicated in FIGURE 8, arranged in pairs X, N, O, P, Q, as indicated by brackets in FIGURE 13.

Figures 6, 7, 20, 21, 22, 23, 24, 25, 26, 27:
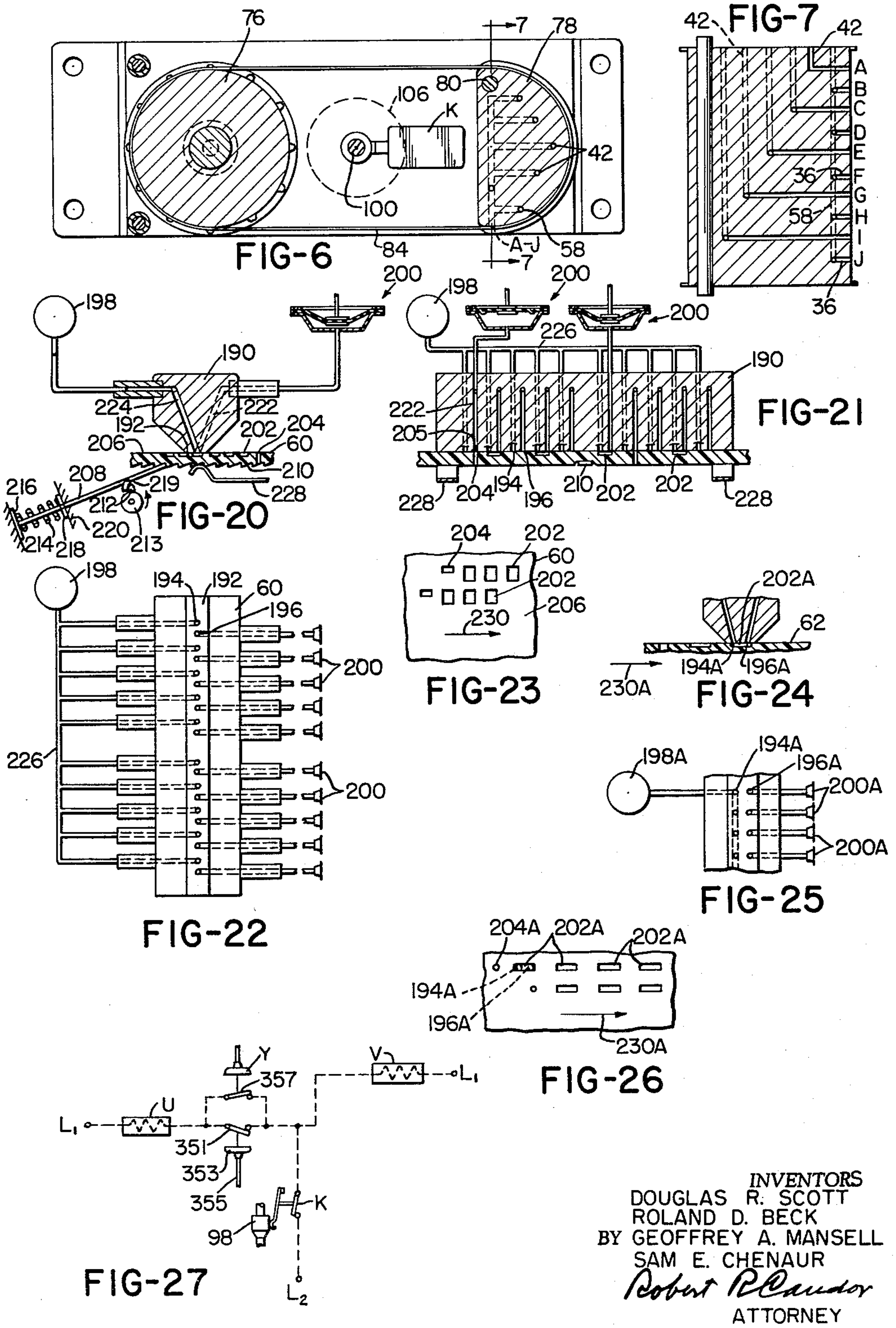
FIGURE 6 is a horizontal cross section of FIGURE 1, taken along the line 6—6 of FIGURE 1.
FIGURE 7 is the vertical cross section along the line 7—7 of FIGURE 6.
FIGURE 20 is a diagrammatic generally cross-sectional view of an intermittently operated flexible member passing under a typical reading head and connected to a pump and a vacuum actuator.
FIGURE 21 is a generally transverse cross section of the embodiment of FIGURE 20.
FIGURE 22 is a diagrammatic upward view of the reading head, pump and actuator of FIGURE 20.
FIGURE 23 is a typical top view of the flexible member or card of FIGURE 20.
FIGURE 24 is a view somewhat similar to a portion of FIGURE 20, and showing the intake and discharge ports and passageways in longitudinally aligned condition.
FIGURE 25 is an upward view of the reading head, vacuum pump, and vacuum actuators of FIGURE 24.
FIGURE 26 is a top view of the flexible member or card of FIGURE 24.
FIGURE 27 is another embodiment of a portion of FIGURE 8 showing the addition of a water level control arrangement to control the filling operation.

The discharge ports A, C, E, G, and I, FIGURES 7 and 8, are connected to suitable discharge passageways 42, which are connected to tubes 43, similar to the tube 43 of FIGURES 9, 10, and 11, which are connected to the vacuum actuators X, N, O, P, Q of FIGURE 8. The suction passageways 36, which are connected to the intake ports B, D, F, H, and J, may be connected to a common manifold 58, which in turn may be connected to the tube 37, which is connected to the vacuum pump 38, which may be similar to the vacuum pump of FIGURES 9, 10, and 11.

As the indentations 50 are moved over a pair of adjacent ports, the indentations 50 act to establish communication between such pairs of ports. For example, when an indentation 50 passes over ports I and J, communication is established between the vacuum actuator tube 43 and the vacuum pump 38 to close the switch R and cause operation of the motor W of the washing machine 90 in a manner to become more fully evident.

The roller 76 is driven by a synchronous motor U through a friction clutch 92, a pinion 94 and a driven disc gear 96. Energization of the motor U is controlled by a switch K which is actuated by a cam 98 which is carried by an axially shiftable rotatable setting shaft 100. The setting shaft 100 carries a gear 102 which meshes with the gear 96 and is connected to a diaphragm 104 of the vacuum actuator X.

Figure 1A:
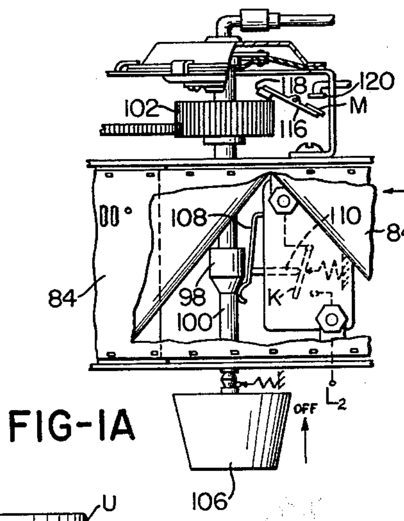
FIGURE 1A is a view of a portion of FIGURE 1 with the control knob moved from the "on" position of FIGURE 1 to the "off" position of FIGURE 1A.
Figure 4A:
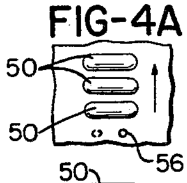
FIGURE 4A is a top view of the flexible member of FIGURE 4.
Figure 4:
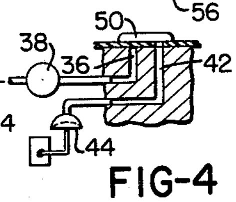
FIGURE 4 is a view similar to FIGURE 3, and showing the flexible program member breaking the vacuum of the vacuum actuator, while preventing the breaking of the vacuum of the vacuum pump.
Figure 1:
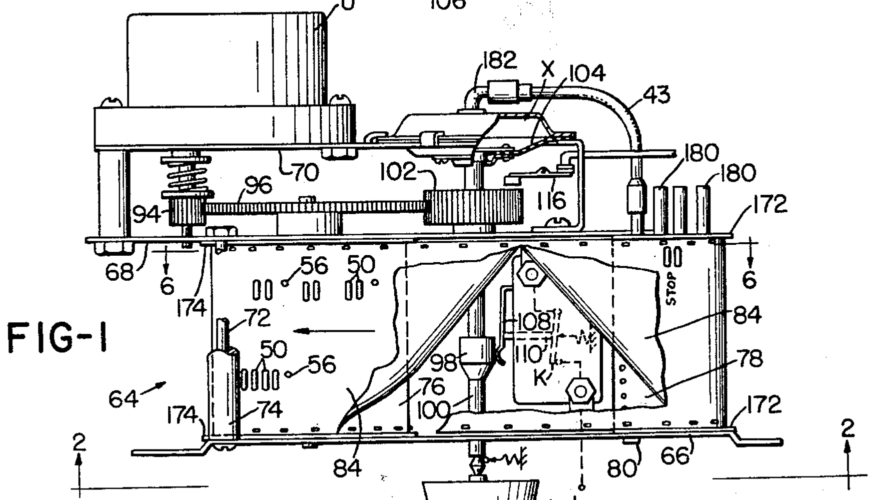
FIGURE 1 is a diagrammatic side elevation of one embodiment of this invention, with parts broken away.
Figure 2:
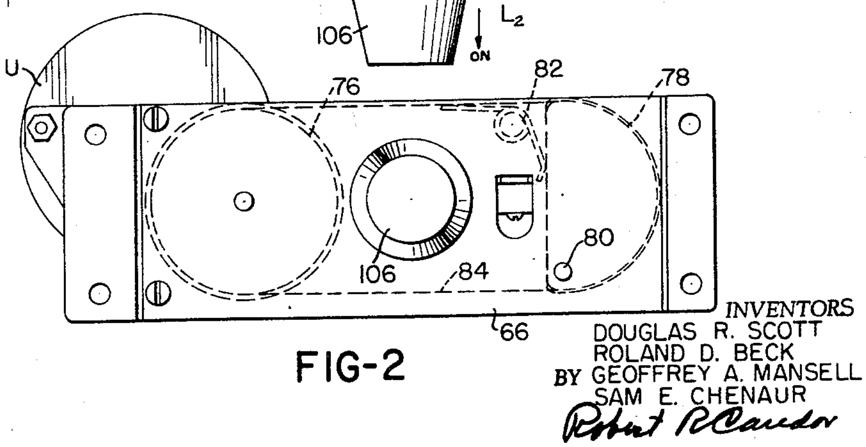
FIGURE 2 is a bottom view of FIGURE 1 viewed from line 2—2 of FIGURE 1.
Figure 5:
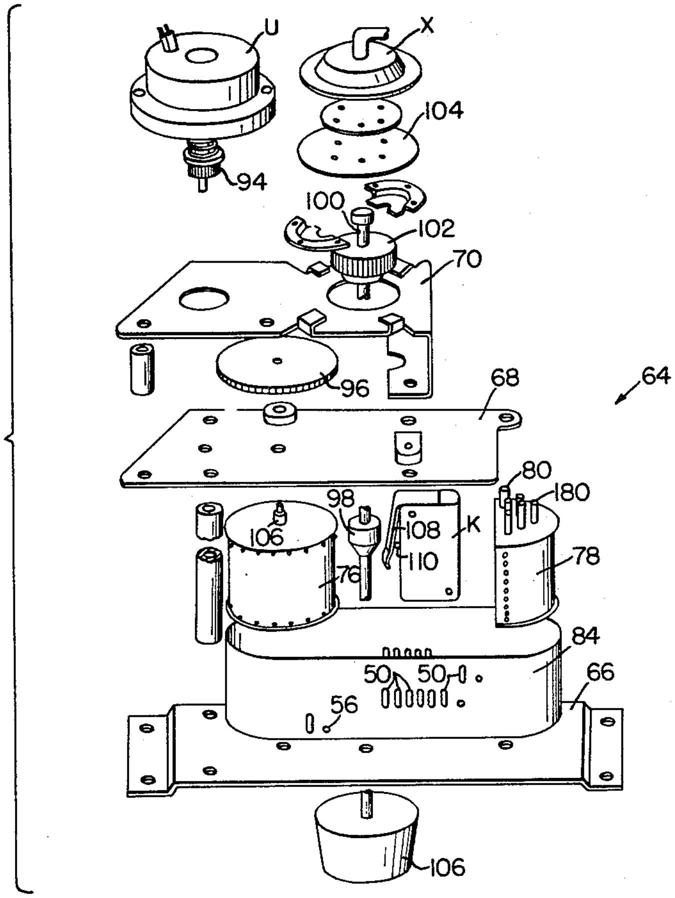
FIGURE 5 is an exploded view of certain parts of FIGURE 1.

The knob 106 on the shaft 100 may be pushed in, or upward, to the position of FIGURE 1A, to turn off the operation of the apparatus, and may be pulled out, or downward, to the position of FIGURE 1, to turn on the apparatus. When the knob of 106 is down, or ON, the cam 98 moves the leaf spring 108 rightward to move the plunger 110 rightward and to close the switch K, as in FIGURE 1, to close the circuit, shown in FIGURE 8 by a dash line, which includes line $L_1$, motors U and V, closed switch K, and line $L_2$, this causes the motors U and V to be operated or energized so that they drive the programmer 94 and the vacuum pump 38, respectively.

Because of the slip of clutch 92, the user may turn the knob 106, shaft 100, gears 102 and 96, and thus move the roller 76 by means of the shaft 112, to move the belt 84 independently of the motor U to set the belt 84 in any desired position over the reading head 78.

When the knob 106 is pushed up to the position in FIGURE 1A, the leaf spring 108 moves under its own bias leftwardly and allows the plunger 110 to move leftwardly, to open the switch K, and thus to open or deenergize the electric circuit which is connected to the motors U and V. This stops the motors U and V.

The user may therefore cause the programmer or timer 64 to start or stop by pulling or pushing the knob 106 axially of the shaft 100. In addition, the user may set the belt 84 in any relation desired with respect to a pointer, such as pointer 114, which shows the relation of the programs on belt 84 to the ports on reading head 78.

The belt 84 may have suitable printing on it which may be read by the user and which may be used to indicate or show the progress of the program which is being used. The belt 84 may have a plurality of different programs, each causing the washing machine 90 to operate through a selected program, starting, for example, with the filling of the tub, causing agitation and spinning as desired, and, thereafter, stopping the washing machine 90, the programmer 64, and the motors U and V, as will elsewhere be apparent.

The programmer or timer 64 may be provided with means automatically to stop itself at the end of a selected wash cycle. For this purpose, the belt 84 may be provided with stop indentations 50A, FIGURE 8, which will bridge the ports A and B to connect the vacuum actuator X and the vacuum pump 38. This causes the actuator X to move the shaft 100 and knob 106 upwardly from the ON position of FIGURE 1, to the OFF position of FIGURE 1A. This eventually opens switch K and stops the motors U and V. Also a valve M may be opened, as in FIGURE 1A, by the movement of the lever 116 clockwise about its central fulcrum by movement of shaft 100 and gear as it is pulled upwardly by actuator X. The lever 116 may be biased counterclockwise by any suitable spring construction, not shown. For example, the gear 102 may strike the end 118 of the lever 116 and thus raise the end 118 and lower the valve M. This opens the end of the tube 120 which is connected to the tube 37, which leads to the vacuum pump 38. This breaks the vacuum in the pump portion of the pneumatic system and will also break any vacuums which may exist in the actuator lines 43 of the system, where any ports are bridges at the stop position of the belt 84.

If desired, a plurality of stop indentations 50A may be provided, so the actuator X is certain to be subjected to vacuum for a sufficient period of time to stop the entire assembly. The relationship of the cam 98, and the contact of the gear 102 with the end 118 is so proportioned that the valve M is opened before the switch K is opened, so that a vacuum is maintained in the system sufficiently long to open the switch K before the vacuum is broken by the opening of the valve M.

The washing machine 90 may be of any desired type, for washing laundry and the like. Also any other machine may be program controlled by the programmer or timer 64. Merely by way of example, the washing machine 90 may include an imperforte rotatable tub 120 located inside a non-rotatable tub 122. The tubs 120 and 122 are supported by suitable resilient supporting means, not shown, which is capable of permitting proper counterbalancing action when the tub 120 is centrifically rotated. Laundry and the like, is placed inside the tub 120, and washing liquid or water is introduced into the tub 120 from the faucet 124 for example, in an automtic manner, so that the desired level of washing liquid is provided in the tub 120. Thereafter the agitator 126 is caused to operate to agitate and wash the clothes, while the tub 120 is maintained substantially stationary or in non-rotating condition. However, it may swing or vibrate slightly. In the case of the more or less horizontal type of machine, the agitation may be produced by slow rotation of the tub, which contains suitable vanes to produce the desired agitation. After a suitable length of time, the tub 120 is centrifugally rotated with the agitator 126 generally following the motion and rotation of the tub 120. The laundry is maintained inside the tub 120 by suitable arresting means, and the free liquid is discharged over the rim 128 of the tub 120 into the tub 122. The centrifugally extracted liquid is discharged into the tub 122 over the rim 128 and from thence it passes through the discharge pipe 130, through the water pump 132 to the discharge pipe or hose 134. The hose may be provided with a goose neck 136 to fit over the stationary tub 138 from which the wash water is drained by pipe 139 to the drain system of the dwelling.

The various parts of the washing machine 90 may be driven in any conventional manner as diagrammatically indicated. For example, a washing machine motor W drives a transmission 140 which in turn drives the agitator 126 in an agitation motion while the tub 120 is maintained substantially stationary during the agitation cycle. The transmission 140 drives the tub 120 in a centrifugal rotation during the spin extraction period.

The washing machine motor W may also drive the pump 132 at all times that the motor W operates. Wash water may be introduced into the tub 128 through the faucet 124 and under the control of a hot water valve S and a cold water valve T which are connected respectively with a cold water supply pipe 142 and hot water supply pipe 144. The hot water supply pipe 144 may be supplied with hot water from the usual domestic hot water heater 146, which may be thermostatically controlled in the usual manner, to maintain the water in the heater 146 at a predetermined desirable temperature. When it is desired to provide a hot wash, the hot water valve S only is opened for a predetermined period of time by the use of the proper number of indentations 50. This introduces hot water through the faucet 124 into the tub 120. A suitable constant volume discharge controller or valve or orifice 148 may be provided adjacent the faucet 124. This valve 148 causes water to be delivered through the faucet 124 at a substantially constant volume per unit of time, in a well known manner.

The program controller 64 causes the vacuum actuator N to be energized during the hot water fill for a predetermined period of time, which is of the correct length to produce the desired level of liquid in the tub 120.

When a tepid fill is desired in the tub 120, both valves S and T are opened by the actuators N and O respectively, in which case a mixture of hot and cold water is produced, which supplies a tepid water fill in the tub 120.

If a cold water fill is desired, then only the cold water valve T is opened while the hot water valve S remains closed, in which case the faucet 124 supplies the cold water fill into the tub 120. All of these fills are correctly timed to produce the desired water level in the tub 120.

The transmission 140 may be provided with lever or other control means 150, which is emblematic of any type of control to produce the desired tub and agitator motions. Merely by way of example, when the actuator P is subjected to vacuum, the transmission 140 may cause the tub 120 to spin for centrifugal extraction. When the actuator P is not subjected to vacuum, then the transmisson 140 may produce agitation by the agitator 126. However, it is to be understood that the actuator P may produce the converse reaction in the transmission 140 when subjected to vacuum, as is obvious.

FIGURE 13 is a chart which shows a typical program to be produced in the washing machine 90. However, it is to be understood that this program is merely typical and may be a different program if desired. In addition, a plurality of complete washing programs may be produced on the belt 84, by producing the proper number, spacing, etc., of the indentations 50 and the openings 56. The user may select the desired program by turning the knob 106 to move the belt 84 to the desired position.

Preferably each program has a start position indication, which, if desired, is placed opposite the indicator 114 by turning knob 106. Then the knob 106 is pulled outwardly to close the switch K and to permit the biased lever 116 to close the valve M by the downward movement of the gear 102. This causes the motor U to start movement of the belt 84, and causes the vacuum motor V to operate the pump 38 to produce a vacuum in the vacuum pump side of the pneumatic system. Then various pairs of ports are bridged by the various indentations 50 which are properly positioned on the belt 84 to produce the desired conditions, such as indicated in the chart, which is believed to be self explanatory. Also stop openings 56 may be provided to stop the various operations, and so that the proper vacuum is broken on the actuator side of the system after the respective operation has been completed. At the end of the complete washing program, the indentation or indentations 50A bridge the ports A and B to energize actuator X to open the switch K and thus stop the motors U and V and to open the valve M. This breaks any vacuum in the entire system which at that time may be connected to the vacuum pump 38. It is understood that all of the actuator connections which are not at that time connected to the vacuum pump had been previously subjected to a vacuum breaking operation.

If desired, the shaft 100, FIGURE 12, and which may be any of the shafts disclosed, may be provided with a snap action or detent action to lock the shaft 100 in ON or OFF position with a slight snap action when moving from one to the other. For example, a double groove 160 and 162 may be separated by a ridge 194. A detent ball 166 may be axially held by the tube or passageway and may be pushed by the compression spring 170, so it enters the groove 160 with a snap action when the shaft 100 is moved near the ON position and so the ball 166 enters the groove 162, when the shaft 100 is pushed near the OFF position.

Proper flanges 174 may be provided at the ends of the roller 76, to prevent the belt 84 from moving axially along the roller 76. Likewise, proper flanges 172 may be provided on the reading head 78 for the same purpose.

The vacuum actuators preferably are made so they require a minimum amount of air to be inserted or removed therefrom, to produce the required actuating action. To this end they may be made relatively flat to produce a relatively large diaphragm area subject to atmosphere-vacuum differential. The vacuum chambers adjacent the diaphragms are made relatively shallow, being deep enough only to permit the required movement of the diaphragm. This reduces materially the volume of air to be evacuated from or introduced into the actuator.

Suitable nipples 180 are provided at the ends of the passageways 36 and 42, FIGURE 1. Similar nipples 182 may be provided at the various actuating devices. The nipples 180 and 182 may be connected by suitable tubing, such as plastic tubing, of sufficient strength to prevent collapsing under the vacuum which may be used, as indicated at 43 in FIGURES 1 and 8. And similar nipples 183 may be provided for the connection of the various actuating devices and also for the connection of the tube 37 between the nipple 184 and a nipple 186 at the vacuum pump. When a vacuum is produced in the particular part of the system in which any respective tube 43 and/or 37 is located, the tube is telescoped on the outside of the respective nipple, and the vacuum action produces a squeezing action at the telescoping portions to tighten the joint.

FIGURES 20–23 show an embodiment in which a flexible card 60 which may be made of plastic material, is intermittently advanced rightward, for example, in FIGURES 20 and 23. A reading head 190 may be provided with a reading surface 192 which has intake ports 194 and discharge ports 196 connected respectively with a vacuum pump 198, and one or more vacuum actuators 200. The card 60 may have a plurality of indentations 202 and with a plurality of vacuum breaking holes 204, which holes may be rectangular if desired.

The card 60 may be part of a belt such as shown in FIGURES 1–8, or the like. The card 60 may be advanced by continuous motion instead of intermittently.

The cooperation between the pump 198, the actuator or actuators 200, the ports 194 and 196, the reading head surface 192 and the card surface 206 are substantially the same as has been previously described in connection with FIGURES 9, 10, 10A, and 11. However, the card 60, or a belt of similar construction to that shown in FIGURES 1 through 8, may be caused to pass under the reading head 190 in a manner so the indentations 202 bridge the ports 194 and 196 during the pauses of the intermittently moved card 60. An intermittent driving rod or rods 208 engage or engages the ratchets 210. The amplitude of the intermittent impulse is such that the indentations 202 are placed under the ports 194 and 196 at the pause of the advance of the card or belt 206.

Actuator rod or rods 208 are moved rightward by a quick impulse acting on the ratchets 210, quickly to move the indentations 202 and/or the holes 204 for a distance of one impulse. For example, a compression spring 214 has one end engaging a disc or plate 216 through which the rod 208 slides. The other end of the spring 214 is attached to the movable plate or disc 218. The plate 218 is attached to the rod 208, and moves leftward with the rod 208. The cam 212 on the rotatable cam wheel 213 may be so constructed that it slowly moves the rod 208 leftward against the compression action of the spring 214. The cam 212 then releases the latch 220 with the quick action by sliding past the hook 219 so the drive rod 208 is driven with a quick action by the spring 214 in a rightward direction for a distance equal to that of the spaces between the various indentations 202 and holes 204. The disc 218 is stopped by the stationary member 220. Proper snubbing actions, stopping actions, etc., may be provided to restrain card 206 from overshooting, as is obvious. Any drives which are now available may be used for producing this intermittent action in lieu of the specific drive illustrated. For example, an electric motor may store energy in a compression spring during the pause of the intermittent motion, and then quickly release this motion to produce a rotation of an eccentric, or to produce any other reciprocating action, to produce the desired intermittent motion.

In FIGURES 20–23, the pairs of ports 194 and 196 are transverse to the forward motion of the card 60. The length of the indentations 202 are also transverse to the motion of the card 60, so the indentations 202 properly bridge the correct pairs of ports 194, 196, to produce a vacuum connection between the pump 198 and the actuator 200. As shown in FIGURE 21, and FIGURE 22, the openings 204 are connected only to the ports 196 and the passageways 222, which are connected with the actuators 200. The ports 194 are connected to the passageways 224 which may directly or indirectly be connected to the vacuum pump 198. For example, the passageways 224 may be connected to a manifold 226, which in turn is connected with the vacuum pump 198.

If desired, the card 60 may be held against the reading head surface 192 by one or more springs 228. The card 60 may move rightward, as indicated by arrow 230.

FIGURES 24, 25, and 26 have substantially the same intermittent motion and substantially the same result of connecting a vacuum pump 198A to one or more vacuum actuators 200A. Substantially, the same intermittent motion, etc., may be produced in the card 62. However, the suction ports 194A and the matching discharge ports 196A may be aligned in the direction of the travel of the card, as indicated by the arrow 230A. The indentations 202A have their length parallel to the arrow 230A. The intermittent motion has its pauses so produced that each matching pair of ports 194A and 196A are bridged by the respective indentation 202A. The bridging action takes place during the pause of the intermittent advance. The vacuum breaking hole 204A is so spaced from the adjacent indentation 202A that the hole 204A is directly over the port 196A during the pause of the intermittent motion, so that only the vacuum to the vacuum actuator 200A is broken by the hole 204A but is not broken in the connection to the pump 198A. The hole 204A travels over the port 194 swiftly during the fast forward movement of the card, so it does not materially break the vacuum to the pump 198A. However, at the stop position, an indentation 202A produces the proper connection of the pump 198A to a vacuum actuator 200A, which corresponds to X in FIGURES 1 through 8 to produce a stopping action of the machine.

In general, the actions of the embodiments of the FIGURES 20–26 are substantially the same in end results as has been disclosed in connection with FIGURES 1 through 13. The program or timing devices of FIGURES 20 through 26 may be used to control a washing machine substantially in the same manner as disclosed in FIGURE 8.

FIGURES 17, 18, 19, and 19A show typical actuations which may be produced by the vacuum actuators of this invention. For example, FIGURE 17 shows a type of valve which may be used at S and T in FIGURE 8. The pipe 144 (or the pipe 142) may have a dividing wall 230 which has a port or opening 232 which is opened and closed by the valve disc 234. The vacuum actuator N may be provided with a nipple 182 which is connected to the dome or vacuum cavity 236. A diaphragm 238 is connected to a rod or the like 240 which moves the valve disc 234 back and forth as vacuum is produced or broken in the cavity 236. A return spring 242 may be provided to aid in returning the valve 234 disc to closed position after the vacuum is broken. However, the return movement may be provided by a spring or the like in the valve construction.

The valve construction shown in FIGURE 17 is typical only, and any suitable type of valve may be substituted, and any suitable type of vacuum actuator may be used.

FIGURE 18 shows a vacuum actuator P, which may be of the type shown at P in FIGURE 8. The vacuum actuator P may be substantially the same as shown in FIGURE 17 and actuates the rod 240 in the same manner as in FIGURE 17. The rod 240 may actuate the lever or the like 250 about the fulcrum shaft 244. The lever 150 may change the operation of a transmission or the like 140, which, for example, may change the operation of the washing machine from agitation to centrifugal extraction, or vice versa.

FIGURE 19 shows a vacuum actuator Q, which may be of the type shown at Q in FIGURE 8. The actuator Q may be substantially the same as the actuator N of FIGURE 17 and may be provided with a rod 240 of the same character as in FIGURE 17. The rod 240 may move a switch blade or the like R which opens and closes a power circuit from line $L_1$ to $L_2$ in response to the making or breaking of a vacuum in the vacuum actuator Q. For example, a washing machine motor W or the like, which may be similar to the motor W of FIGURE 8, may be provided with suitable winding 246, which may include a suitable running winding and starting winding and suitable starting winding control, not shown. The closing of switch R causes the motor W to operate and opening of the switch R causes the motor W to stop.

FIGURE 19A shows a vacuum actuator Q′ which may be substantially the same as the actuator N in FIGURE 17 and which may be provided with a rod 240 substantially of the same character as in FIGURE 17. However, the rod 240 of FIGURE 19A may open and close the twin switches R′ and R″ to make and break any set of circuits which may be controlled thereby.

FIGURES 17, 18, 19, and 19A are indended to show typical vacuum actuators, and typical devices being actuated thereby, but other actuators and devices actuated thereby may be also used, as is obvious.

The springs 242 illustrated in the actuators of FIGURES 17, 18, 19, and 19A may be omitted if the mechanisms operated thereby have rightward bias built into the mechanism.

Figure 14:
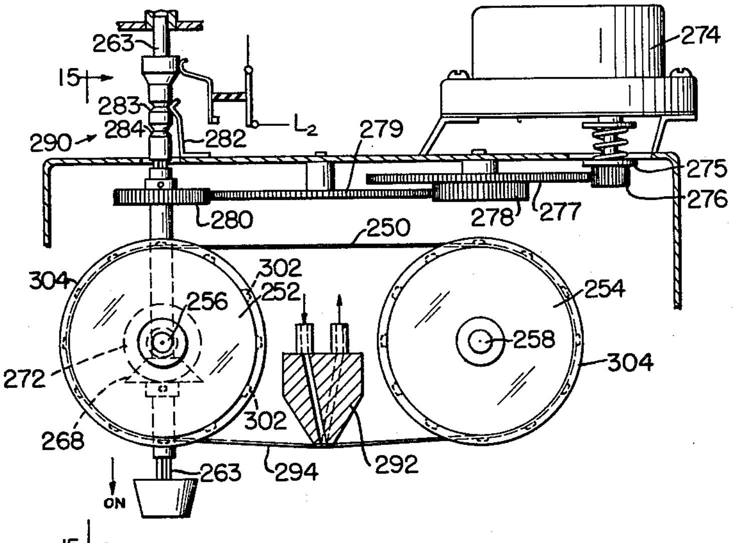
FIGURE 14 is a diagrammatic horizontal view of another embodiment of this invention.
Figure 16:
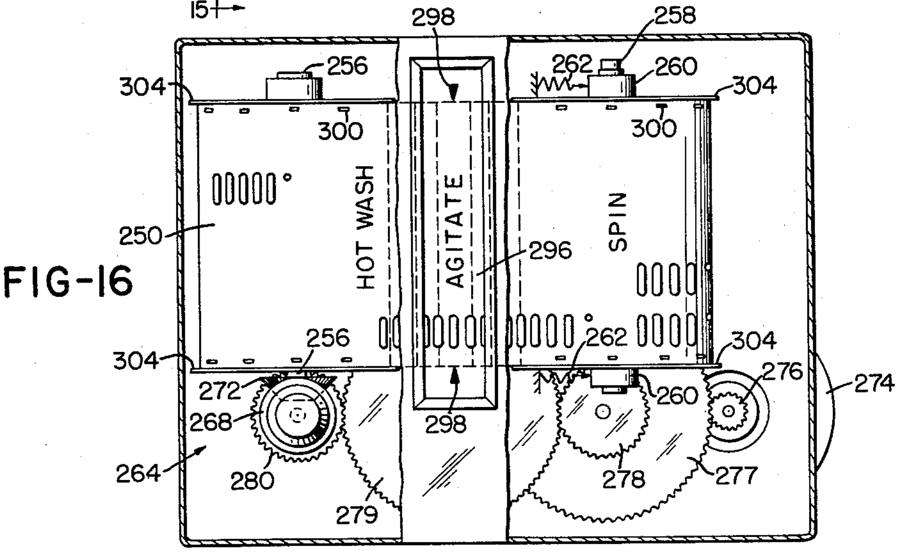
FIGURE 16 is a front view of the embodiment of FIGURE 14.
Figure 15:
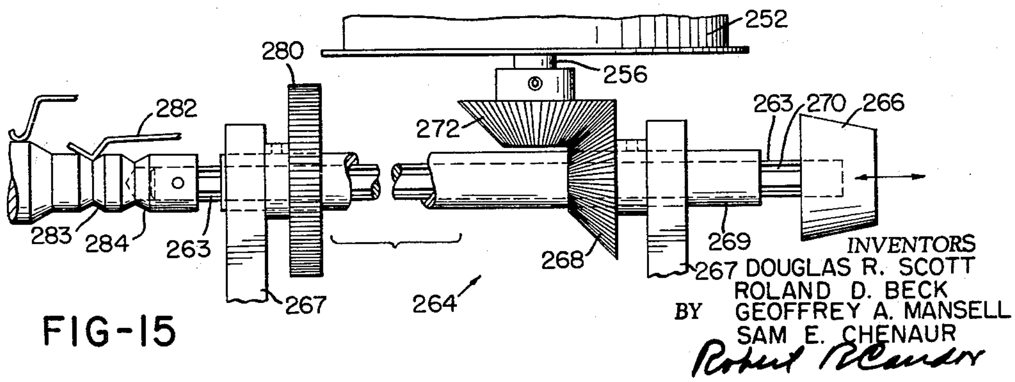
FIGURE 15 is a diagrammatic vertical view of a portion of FIGURE 14, somewhat along line 15—15 of FIGURE 14.

FIGURES 14, 15, and 16 show another embodiment. A belt 250 may be substantially similar to the belt 84 of FIGURES 1–13. However, the belt 250 may pass over the rollers 252 and 254. Roller 252 may be a driving roller, and roller 254 may be a driven or idler motor. Shafts 256 and 258 may be provided for these respective rollers. If desired, the shaft 258 may be provided with bearings 260, which are rightwardly pushed by springs 262, to provide the desired tension in the belt.

A combined setting and drive shaft construction 264 is horizontally disposed under the roller 252 and is provided with a knob 266 for turning the shaft 264. An axially fixed and rotationally free bevel gear 268 is carried by axially fixed and rotationally free sleeve 269 in bearings 267. The sleeve 269 is keyed by the key 270 to the axially movable shaft 263 which carries the knob 266. The bevel gear 272, which engages the bevel gear 268, drives the roller 252 through the shaft 256.

If desired, the roller 252 may be driven from the shaft construction 264. To this end, the programmer motor 274 may be provided with a slip clutch 275 and spur gear 276 which drive the intermediate gears 277, 278, 279, and the axially movable gear 280 substantially in the same manner as is done in FIGURES 1 through 13. The shaft 263 may be connected to a diaphragm, vacuum actuator, and a connecting tube substantially the same as diaphragm 104, vacuum actuator X, nipple 182, and connecting tube 43 in FIGURES 1 through 13. A snap acting mechanism 290 may provide snap positions for the ON and OFF positions of the shaft 263 substantially in the same manner described in connection with FIGURE 12. However, a leaf spring construction 282 may engage the grooves 283 and 284 instead of the ball detent mechanism of FIGURE 12.

A reading head 292 may be stationarily held against the run 294 of the belt 250, between the rollers 254 and 252. If desired, a slight bow outwardly in run 294 may be provided to maintain the belt against the reading head 292. The reading head 292 may have ports, passageways, etc., substantially identical with those described in connection with the reading head 78 of FIGURES 1 through 13, or the reading heads of FIGURES 20–26. A window 296 may be placed over the portion of the belt which is adjacent to the reading head 292. Position pointers 298 may be provided to indicate the effective position of the belt 250. The window may have a plastic or glass cover to protect the belt from damage.

By this construction, the belt 250 may be placed on a back panel of a washing machine, so the run 294 may be viewed from the front of the washing machine. The setting knob 266 may also be placed on the back panel and may be pushed away from or toward the user while starting, stopping, advancing or moving backward the belt 250, etc., in a manner which permits the user to view and operate the programmer in a very facile manner.

To insure positive drive of the belt, the belt may be provided with drive openings 300 along the edges of the belt, for example. These openings are engaged by drive teeth 302 on the roller 252 to insure a positive drive of the belt 250. Suitable flanges 304 are provided at the ends of the rollers 252 and 254 to prevent sidewise movement of the belt.

The embodiment of FIGURES 14 through 16 provides a construction which has a reduced amount of friction, since the rollers 252 and 254 move the belt with very little friction, and the position of the reading head is such that very little pressure is produced between the reading head surface and the belt sealing surface.

The belts of FIGURES 1–8 and 14–16 may be moved by intermittent motion instead of continuous motion, if desired. The drive wheels or rollers may be driven by ratchet and pawl construction similar to that disclosed in FIGURES 20–26.

The embodiment of FIGURES 14, 15, and 16 may be used to control a washing machine, such as is shown in FIGURE 8 or any other mechanism desired.

FIGURE 27 shows an embodiment to be added to FIGURE 8 when it is desired to control the filling operation of the tub construction by a water level responsive switch 351 which is maintained open by a water level diaphragm controller 353 as long as the water level in the tub construction is below the desired level. The switch 351 is closed when the water filling means S or T has filled the tub construction to the desired level. The tube 355 is connected near the bottom of a stationary tub of a washing machine within which a perforated rotatable tub is placed, which is a well known construction.

Another normally closed switch 357 is opened by a vacuum actuator Y during the fill cycles only by additional ports on the reading head 78 and additional indentations on the belt 84. The switch 357 remains closed during all other operations.

Hence, the vacuum motor V operates at all times that switch K is closed by the manipulator shaft 100. The timer motor U operates as previously described in connection with FIGURE 8, except that during the fill cycles the timer motor U is stopped by open switches 351 and 357 until the stationary tub is filled. When the tub is filled, switch 351 is closed to operate timer motor U, which in turn moves the belt 84 out of the fill cycle and into the agitator cycle.

It is thus to be seen that a new and useful time controlled apparatus, programmer and method have been provided which have many advantages not heretofore available.

While the form of the invention now preferred has been disclosed as required by the statutes, other forms may be used, all coming within the scope of the claims which follow.

What is claimed is:

1. In combination: a rotatable member movable in a linear direction past a reading zone and including a thin flexible sheet having a plurality of dead end, open channel indentations movable sidewise through said reading zone and spaced longitudinally from each other to form side by side paths of travel; a reading head contacting said rotatable member in said reading zone and having a plurality of pairs of ports with the ports of each pair of ports aligned respectively in said paths to be bridged by said indentations, one of said ports being an intake port to be connected to a source of vacuum and the other of said ports being a discharge port to be connected to a vacuum actuator; a timer motor drivingly connected to rotate said rotatable member; a switch means electrically connected to said motor and having a motor start position and a motor stop position; and a setting and control manipulator having setting means responsive to rotation of said manipulator to set said rotatable member at a desired position with respect to said reading head, and having starting and stopping means responsive to axial movement of said manipulator to move said switch means to motor start position when said manipulator is axially moved in a start direction and to move said switch means to motor stop position when said manipulator is axially moved in a stop direction, said combination having a vacuum actuator connected to a discharge port of a stop one of said pairs of ports and having means to move said manipulator to stop position when a stop one of said indentations passes over said stop one of said pairs of ports.

2. A combination according to claim 1 in which a line connection is provided for a vacuum pump motor which is electrically connected to said switch means to start and stop said vacuum pump motor substantially jointly with the starting and stopping of said timer motor.

3. A combination according to claim 1 in which indicia are placed on said rotatable member adjacent some of said indentations to identify the action to be controlled by said indentation.

4. A combination according to claim 1 in which a stationary indicator is provided to indicate the effective position of said rotatable member.

5. A combination according to claim 1 in which said rotatable member is a rotatable endless belt.

6. A combination according to claim 5 in which said manipulator is rotatable about an axis at an acute angle to the axis of rotation of said belt.

7. A combination according to claim 1 wherein a vacuum dump valve is provided and has closed and opened positions, said dump valve being moved to its closed position when said manipulator is moved to its starting position and said dump valve is being moved to its open position when said manipulator is moved to its stopping position.

8. A combination according to claim 7 wherein a vacuum pump has its inlet side interconnected to said intake ports and to said dump valve.

References Cited by the Examiner

UNITED STATES PATENTS

| | | | |
|---|---|---|---|
| 1,633,487 | 6/27 | Maerten. | |
| 2,098,410 | 11/37 | Williams | 137—624.13 X |
| 2,530,622 | 11/50 | Maris | 137—624.15 X |
| 2,579,598 | 12/51 | Morrison | 137—624.18 X |
| 2,678,063 | 5/54 | Ellis | 137—624.2 X |
| 2,734,674 | 2/56 | Ray | 137—025.21 X |
| 2,960,856 | 11/60 | Bauerlein | 68—12 |

FOREIGN PATENTS

| | | |
|---|---|---|
| 222,144 | 1926 | Great Britain. |
| 1,044,116 | 11/58 | Germany. |

ISADOR WEIL, *Primary Examiner.*